(12) United States Patent
Yajima et al.

(10) Patent No.: US 10,682,957 B2
(45) Date of Patent: Jun. 16, 2020

(54) LAMINATED GLASS FOR VEHICLE WITH INNER MIRROR

(71) Applicant: AGC Inc., Tokyo (JP)

(72) Inventors: Toshimi Yajima, Tokyo (JP); Kiyoshi Nobuoka, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/563,834

(22) Filed: Sep. 7, 2019

(65) Prior Publication Data

US 2019/0389383 A1 Dec. 26, 2019

Related U.S. Application Data

(63) Continuation of application No. PCT/JP2018/007531, filed on Feb. 28, 2018.

(30) Foreign Application Priority Data

Mar. 15, 2017 (JP) .................................. 2017-049334

(51) Int. Cl.
| | |
|---|---|
| *B32B 15/04* | (2006.01) |
| *B32B 17/06* | (2006.01) |
| *B60R 1/04* | (2006.01) |
| *B60J 1/02* | (2006.01) |
| B32B 17/10 | (2006.01) |
| B60R 11/04 | (2006.01) |

(52) U.S. Cl.
CPC .................. *B60R 1/04* (2013.01); *B60J 1/02* (2013.01); *B32B 17/10036* (2013.01); *B32B 2605/006* (2013.01); *B60R 11/04* (2013.01)

(58) Field of Classification Search
USPC ................................ 428/426, 428, 432, 688
See application file for complete search history.

(56) References Cited

U.S. PATENT DOCUMENTS 5,160,780 A 11/1992 Ono et al.

FOREIGN PATENT DOCUMENTS

JP H02-68238 A 3/1990

OTHER PUBLICATIONS

International Searching Authority, "International Search Report," issued in connection with International Patent Application No. PCT/JP2018/007531, dated Apr. 10, 2018.
International Searching Authority, "Written Opinion," issued in connection with International Patent Application No. PCT/JP2018/007531, dated Apr. 10, 2018.

*Primary Examiner* — Lauren R Colgan
(74) *Attorney, Agent, or Firm* — Foley & Lardner LLP

(57) ABSTRACT

A laminated glass for vehicle with an inner mirror mounted to an opening of a vehicle body includes a laminated glass including a vehicle outside glass plate, and a vehicle inside glass plate bonded to the vehicle outside glass plate via an intermediate film; and an inner mirror mounted to the laminated glass via a mirror base. A plate thickness of the vehicle inside glass plate is less than a plate thickness of the vehicle outside glass plate, and is 1.3 mm or less. The vehicle inside glass plate has a cutout portion in at least a part of an upper edge. The mirror base is mounted to a vehicle interior surface of the vehicle outside glass plate through the cutout portion of the vehicle inside glass plate.

7 Claims, 5 Drawing Sheets

LAMINATED GLASS FOR VEHICLE WITH INNER MIRROR

CROSS-REFERENCE TO RELATED APPLICATION

The present application is a continuation application filed under 35 U.S.C. 111(a) claiming benefit under 35 U.S.C. 120 and 365 (c) of PCT International Application No. PCT/JP2018/007531 filed on Feb. 28, 2018 and designating the U.S., which claims priority of Japanese Patent Application No. 2017-049334 filed on Mar. 15, 2017. The entire contents of the foregoing applications are incorporated herein by reference.

BACKGROUND OF THE INVENTION

1. Field of the Invention

The present invention relates to a laminated glass for vehicle with an inner mirror.

2. Description of the Related Art

Conventionally, laminated glasses, in which vehicle outside glass plates and vehicle inside glass plates are bonded via intermediate films, have been used, for vehicle windshields (front glasses), for example. Furthermore, in an upper portion of a vehicle interior surface of the vehicle windshield in front of a driver, an inner mirror is mounted to the windshield, such as a rearview mirror or a back mirror, for visually recognizing a rear side. For example, Japanese Unexamined Patent Application Publication No. 2-68238 discloses a laminated glass, on which an inner mirror is mounted to a mirror base that is bonded to a surface of the windshield via an adhesive agent.

SUMMARY OF THE INVENTION

Problem to be Solved by the Invention

Recently, in order to reduce weights of vehicles and to increase rigidity of windshields, a laminated glass of differing thicknesses including a vehicle outside glass plate having a great thickness and a vehicle inside glass plate having a small thickness has been used.

However, when a thinner glass plate is used for the vehicle inside glass plate so that the weight of the vehicle is further reduced, the rigidity of the vehicle inside glass plate further decreases. Thus, as disclosed in Japanese Unexamined Patent Application Publication No. 2-68238, the structure, in which the mirror base is bonded to the vehicle inside glass plate via an adhesive agent, has a problem that when an external force is applied to the inner mirror, e.g. a driver's operation for adjusting an angle of the inner mirror, the vehicle inside glass plate may break due to the external force.

The present invention has been made in view of the above-described problem, and aims at providing a laminated glass that solves the above-described problem, and reduces the weight of vehicle and increases the rigidity of the windshield.

Means for Solving Problems

In order to solve the problem, according to an aspect of the present invention, a laminated glass for vehicle with an inner mirror mounted to an opening of a vehicle body includes a laminated glass including a vehicle outside glass plate, and a vehicle inside glass plate bonded to the vehicle outside glass plate via an intermediate film; and an inner mirror mounted to the laminated glass via a mirror base. A plate thickness of the vehicle inside glass plate is less than a plate thickness of the vehicle outside glass plate, and is 1.3 mm or less. The vehicle inside glass plate has a cutout portion in at least a part of an upper edge. The mirror base is mounted to a vehicle interior surface of the vehicle outside glass plate through the cutout portion of the vehicle inside glass plate.

Effect of Invention

According to the present invention, a laminated glass for vehicle, in which even when an external force is applied to the inner mirror, such as a driver's operation for adjusting an angle of the inner mirror, the vehicle inside glass plate having a small plate thickness is less likely to break, and a weight of the laminated glass is reduced, is provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, with reference to drawings, embodiments of the present invention will be illustratively described in detail. Note that the components described in the embodiment shown below are merely examples, and the technical scope of the present invention is not limited to the embodiment.

First Embodiment

Figure 1:
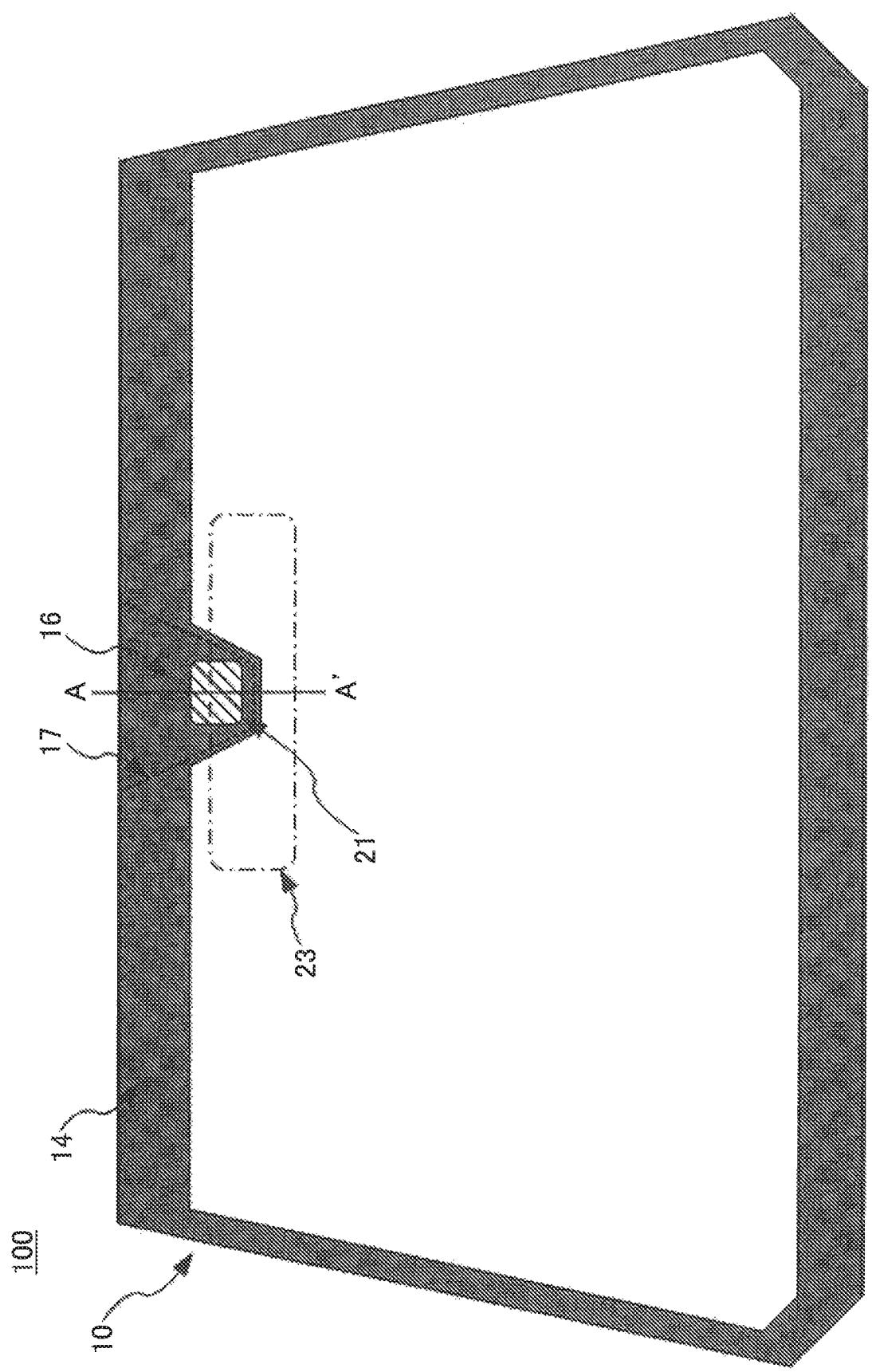
FIG. 1 is a front view depicting an example of a laminated glass for vehicle with an inner mirror according to a first embodiment of the present invention.
Figure 2:
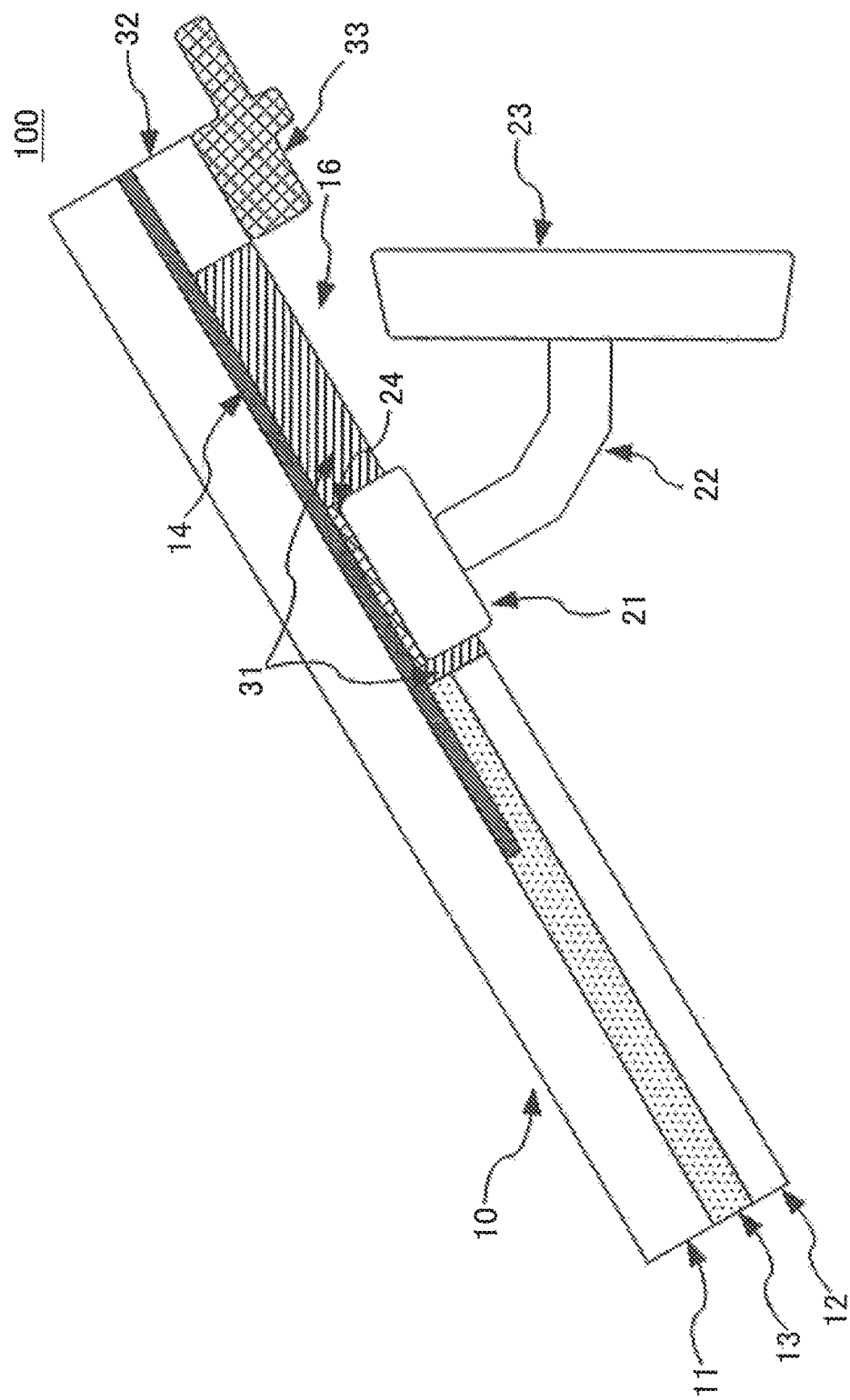
FIG. 2 is a cross sectional view of the laminated glass for vehicle with an inner mirror according to the first embodiment of the present invention, cut along an A-A' line in FIG. 1.

FIG. 1 is a front view depicting an example of a laminated glass for vehicle with an inner mirror according to a first embodiment of the present invention. FIG. 2 is a cross-sectional view obtained by cutting the laminated glass for vehicle with an inner mirror 100 according to the first embodiment, illustrated in FIG. 1, in a direction perpendicular to an outer peripheral edge of the laminated glass for vehicle with an inner mirror 100 (along an A-A' line in FIG. 1). As shown in FIG. 2, the laminated glass for vehicle with an inner mirror 100 according to the first embodiment includes a laminated glass 10 having a vehicle outside glass plate 11, a vehicle inside glass plate 12, and an intermediate film 13 interposed between the vehicle outside glass plate 11 and the vehicle inside glass plate 12; and an inner mirror 23 mounted to the laminated glass 10 via a mirror base 21.

The laminated glass for vehicle with an inner mirror 100 according to the first embodiment is mounted to an opening of a vehicle body, and used as a windshield, for example.

For the intermediate film 13, a film made of a polyvinyl butyral (PVB) is used. In addition to PVB, when water resistance is required, ethylene vinyl acetate copolymer (EVA) is preferably used. Furthermore, acrylic photopolymerization type prepolymers, acrylic catalyzed polymerization type prepolymers, acrylic ester-vinyl acetate photopolymerization type prepolymers, polyvinyl chloride, or the like may be used for the intermediate film 13.

A plate thickness of the vehicle inside glass plate 12 is less than a plate thickness of the vehicle outside glass plate 11. The plate thickness of the vehicle inside glass plate 12 is preferably 0.2 mm or more and 1.3 mm or less, more preferably 0.3 mm or more and 0.8 mm or less, and further preferably 0.4 mm or more and 0.7 mm or less. A weight of the laminated glass 10 is reduced when the plate thickness of the vehicle inside glass plate 12 is 1.3 mm or less. Moreover, when the plate thickness of the vehicle inside glass plate 12 is 0.2 mm or more, a flexural rigidity required for the laminated glass 10 is satisfied. Thus, an operator easily handles the vehicle inside glass plate 12 during conveyance of the vehicle inside glass plate 12.

Note that the vehicle inside glass plate 12 may be a chemically tempered glass. According to the strengthening of the vehicle inside glass plate 12, even when the plate thickness of the vehicle inside glass plate 12 is small, a compressive stress layer is properly formed, and a strength required for the laminated glass 10 is satisfied. Moreover, the vehicle inside glass plate 12 may be a physically tempered glass.

A plate thickness of the vehicle outside glass plate 11 is preferably 1.5 mm or more and 2.3 mm or less, and more preferably 1.7 mm or more and 2.0 mm or less. A weight of the laminated glass 10 is reduced when the plate thickness of the vehicle outside glass plate 11 is 2.3 mm or less. Moreover, when the plate thickness of the vehicle outside glass plate 11 is 1.5 mm or more, a flexural rigidity required for the laminated glass 10 is satisfied.

On a peripheral portion of a vehicle interior surface of the vehicle outside glass plate 11, a shielding layer 14 which is a dark color, such as black, and opaque (dark ceramic layer) is formed in a belt-like shape over the entire periphery of the surface. The shielding layer 14 has a function of protecting a urethane seal member or the like, which bonds the laminated glass 10 to a vehicle body and holds the laminated glass 10 on the vehicle body, from deterioration due to ultraviolet light. In the embodiment, the shielding layer 14 is formed by performing a screen printing, applying a ceramic color paste (black ceramic) formed of a meltable glass frit containing black pigments to the peripheral portion of the vehicle interior surface of the vehicle outside glass plate 11; and baking the ceramic color paste by heating. The shielding layer 14 may be formed by using other known methods. In addition, the shielding layer 14 may be arranged in a peripheral portion of a vehicle exterior surface of the vehicle inside glass plate 12 and/or a peripheral portion of a vehicle interior surface of the vehicle inside glass plate 12.

A position on the laminated glass, to which the inner mirror 23 is mounted, is determined based on a positional relationship between the inner mirror 23 and a driver. Typically, the mirror base 21 is mounted at a position that is located inward in an in-plane direction with respect to an upper edge portion of the laminated glass 10. Thus, the shielding layer 14 formed in the peripheral portion along the upper edge of the vehicle outside glass plate 11 preferably has a part protruding in a direction from the upper edge towards the lower edge of the laminated glass 10. The upper edge refers to a side of the laminated glass 10 near a roof of the vehicle when the laminated glass 10 is mounted to the vehicle body. Moreover, the lower edge refers to a side of the laminated glass 10 near an engine compartment when the laminated glass 10 is mounted to the vehicle body. As shown in FIG. 2, in a cross-section perpendicular to the upper edge (obtained by cutting along an A-A' line of FIG. 1), the laminated glass 10 has a cutout portion 16 in at least a part of the vehicle inside glass plate 12. The cutout portion 16 is preferably formed within a region in which the shielding layer 14 is formed, so that an edge portion 17 of the cutout portion 16 in the vehicle inside glass plate 12 is not viewed from the vehicle outside. FIG. 1 shows the edge portion 17 of the cutout portion 16 that is located along the part of the shielding layer 14 protruding in the direction from the upper edge towards the lower edge. The embodiment of the present invention is not limited to this configuration. As long as the cutout portion 16 is located within the region in which the shielding layer 14 is formed, the position or a shape of the edge portion 17 of the cutout portion 16 is not particularly limited.

Through the cutout portion 16, the mirror base 21 is mounted to the vehicle interior surface of the vehicle outside glass plate 11 via an adhesion layer 24. For the mirror base 21, typical materials are appropriately selected and used, i.e. SUS430 or SUS340 for a base material; nickel plating, die cast zinc, or zinc plating for a metal material; and polycarbonate, glass fiber reinforced polyester resin or the like for a plastic material. A material for the adhesion layer 24 is not particularly limited, and a typical material, such as an epoxy-based material, a urethane-based material, a silicone-based material, or a modified silicone-based material, is appropriately selected and used.

As shown in FIG. 2, the mirror base 21 is preferably bonded to the vehicle interior surface of the vehicle outside glass plate 11 on the shielding layer 14 via the adhesion layer 24. When the mirror base 21 is mounted on the shielding layer 14, the mirror base 21 and the adhesion layer 24 are not viewable from the vehicle outside.

The inner mirror 23 is mounted to the laminated glass 10 via the mirror base 21. Moreover, the inner mirror 23 may be mounted to the laminated glass 10 via a support arm part 22 that supports the inner mirror 23 and the mirror base 21. For the support arm part 22, a known material is appropriately selected and used, and the support arm part 22 has a known shape.

According to the first embodiment, even when the inner mirror 23 is mounted to the laminated glass 10 including a thin glass plate having a plate thickness of 1.3 mm or less for the vehicle inside glass plate 12, the mirror base 21 is not attached to the vehicle inside glass plate 12 having a low rigidity but attached to the vehicle outside glass plate 11 having a high rigidity. Thus, the vehicle outside glass plate 11 is less likely to break by an external force applied to the inner mirror 23, such as the driver's operation for adjusting an angle of the inner mirror 23. Furthermore, because a stress against an external force is not applied to the vehicle inside glass plate 12 having a low rigidity, there is no possibility of breakage of the vehicle inside glass plate 12. Moreover, because an external force that would deform the vehicle inside glass plate 12 due to a stress against the force is not applied to the vehicle inside glass plate 12, a force to separate the intermediate film 13 is not applied to the intermediate film 13, and there is no possibility of generation of bubbles in the peripheral portion of the laminated glass 10.

As shown in FIG. 2, a seal member 31 may be arranged in a region in the cutout portion 16, other than the region to which the mirror base 21 is attached, so that the edge portion 17 of the cutout portion 16 is not exposed. When the seal member 31 is arranged so that the edge portion 17 of the cutout portion 16 is not exposed, water does not readily enter an edge portion of the intermediate film 13, and it is preferable. A material for the seal member 31 is not particularly limited, and a typical material, such as a urethane-based material, or a silicone-based material, is appropriately selected and used. Moreover, a spacer made of synthetic resin 32 may be arranged near the upper edge of the laminated glass 10 in the cutout portion 16. When the spacer made of synthetic resin 32 is arranged near the upper edge of the laminated glass 10 in the cutout portion 16, a long seal member 33, for mounting and fixing the laminated glass for vehicle with an inner mirror 100 to a vehicle body, is firmly attached to the laminated glass 10, and it is preferable. Moreover, a double-sided tape, a nonwoven fabric, glass, or the like may be used instead of the spacer 32 made of synthetic resin.

Second Embodiment

Figure 3:
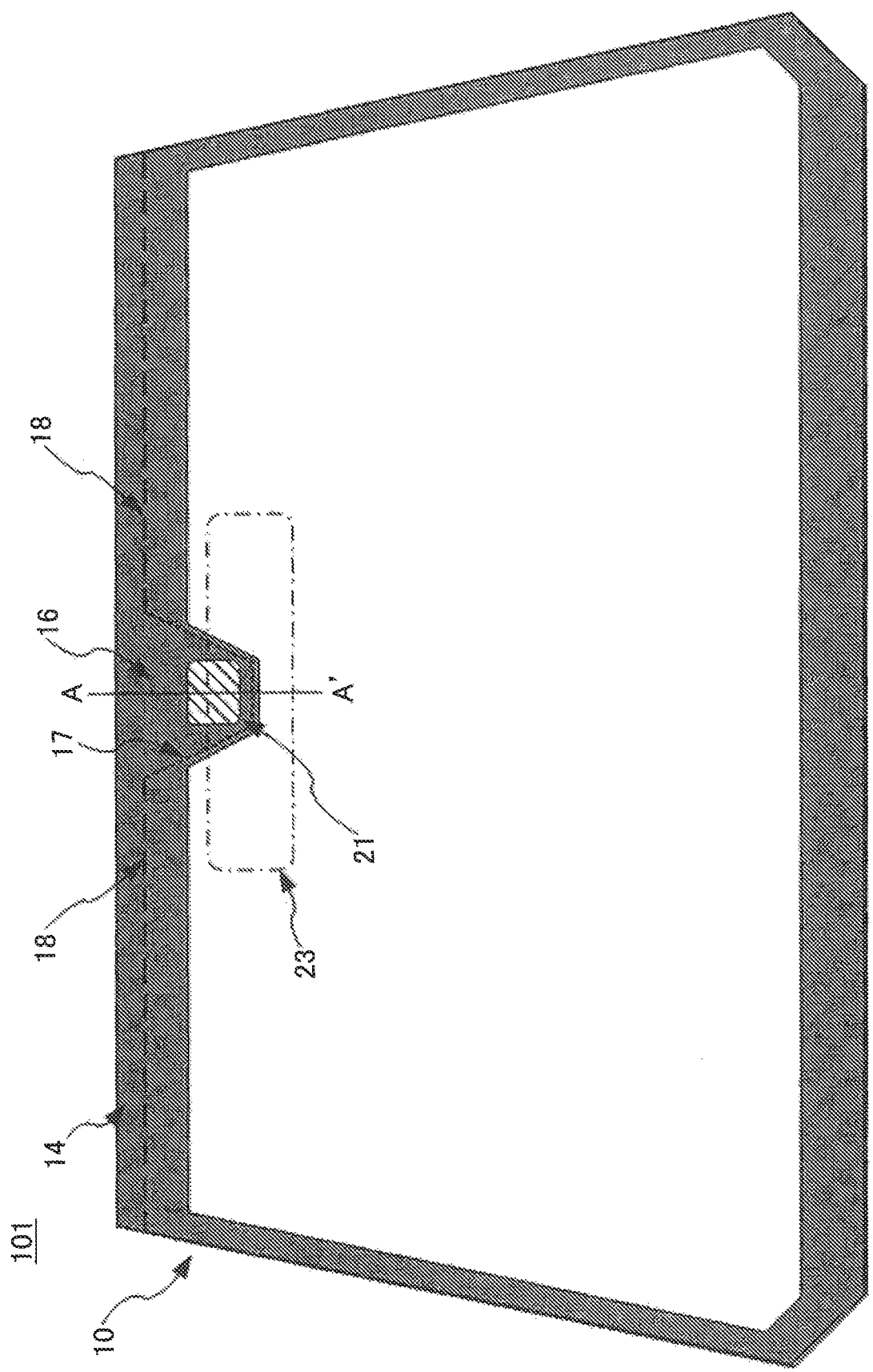
FIG. 3 is a front view depicting an example of a laminated glass for vehicle with an inner mirror according to a second embodiment of the present invention.

FIG. 3 is a front view depicting an example of a laminated glass for vehicle with an inner mirror according to a second embodiment of the present invention. As shown in FIG. 3, the laminated glass for vehicle with an inner mirror 101 according to the second embodiment is different from the laminated glass for vehicle with an inner mirror 100 according to the first embodiment in that the upper edge portion 18 of the vehicle inside glass plate 12 is located inward in the in-plane direction with respect to the upper edge portion of the vehicle outside glass plate 11. Other components are the same as those in the laminated glass for vehicle with an inner mirror 100 according to the first embodiment. Thus, the same reference numerals are assigned to the corresponding components, and an explanation thereof will be omitted. The phrase "inward in the in-plane direction" refers to a direction toward a center of gravity of the laminated glass 10.

In the laminated glass for vehicle with an inner mirror 101 according to the second embodiment, the plate thickness of the vehicle inside glass plate 12 is 1.3 mm or less, and thus the rigidity of the vehicle inside glass plate 12 is low. However, because the upper edge portion 18 of the vehicle inside glass plate 12 is located inward in the in-plane direction with respect to the upper edge portion of the vehicle outside glass plate 11, the long seal member 33 for mounting and fixing the laminated glass for vehicle with an inner mirror 101 to a vehicle body, is attached to the vehicle outside glass plate 11 having a great plate thickness and a high rigidity. When the seal member 33 is attached to the vehicle outside glass plate 11, even if an external force, such as a vibration of the vehicle body, is applied to the vehicle outside glass plate 11, according to the high rigidity, the vehicle outside glass plate 11 does not readily break. Furthermore, because a stress against the external force is not applied to the vehicle inside glass plate 12 having a low rigidity, both the vehicle outside glass plate 11 and the vehicle inside glass plate 12 do not readily break. Moreover, because a force to deform the vehicle inside glass plate 12 is not applied to the vehicle inside glass plate 12, a force to separate the intermediate film 13 is not applied to the intermediate film 13, and there is no possibility of generation of bubbles in the peripheral portion of the laminated glass 10.

Figure 4:
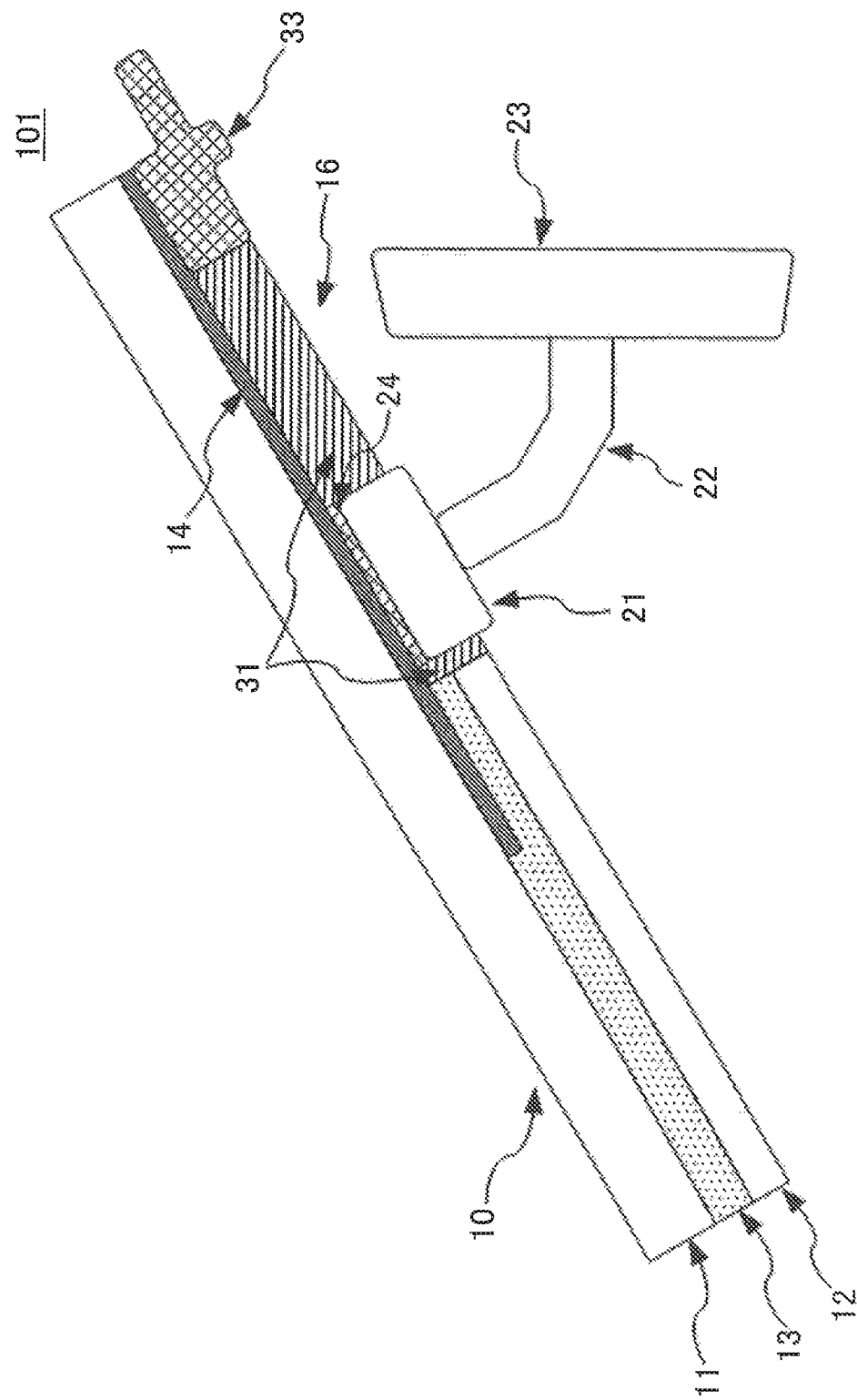
FIG. 4 is a cross sectional view of the laminated glass for vehicle with an inner mirror according to the second embodiment of the present invention, cut along an A-A' line in FIG. 3.

FIG. 4 is a cross-sectional view obtained by cutting the laminated glass for vehicle with an inner mirror 101 according to the second embodiment, illustrated in FIG. 3, in a direction perpendicular to an outer peripheral edge of the laminated glass for vehicle with an inner mirror (along an A-A' line in FIG. 3.) In the laminated glass for vehicle with an inner mirror 101 according to the second embodiment, the upper edge portion 18 of the vehicle inside glass plate 12 other than the cutout portion 16 is located inward in the in-plane direction with respect to the upper edge portion of the vehicle outside glass plate 11. Thus, as shown in FIG. 4, in the cutout portion 16 of the vehicle inside glass plate 12, the spacer 32 for attaching the seal member 33 to the vehicle outside glass plate 11 (See FIG. 2) becomes unnecessary. A seal member 31 may be arranged in a region in which the vehicle interior surface of the vehicle outside glass plate 11 is exposed to the vehicle inside.

Third Embodiment

Figure 5:
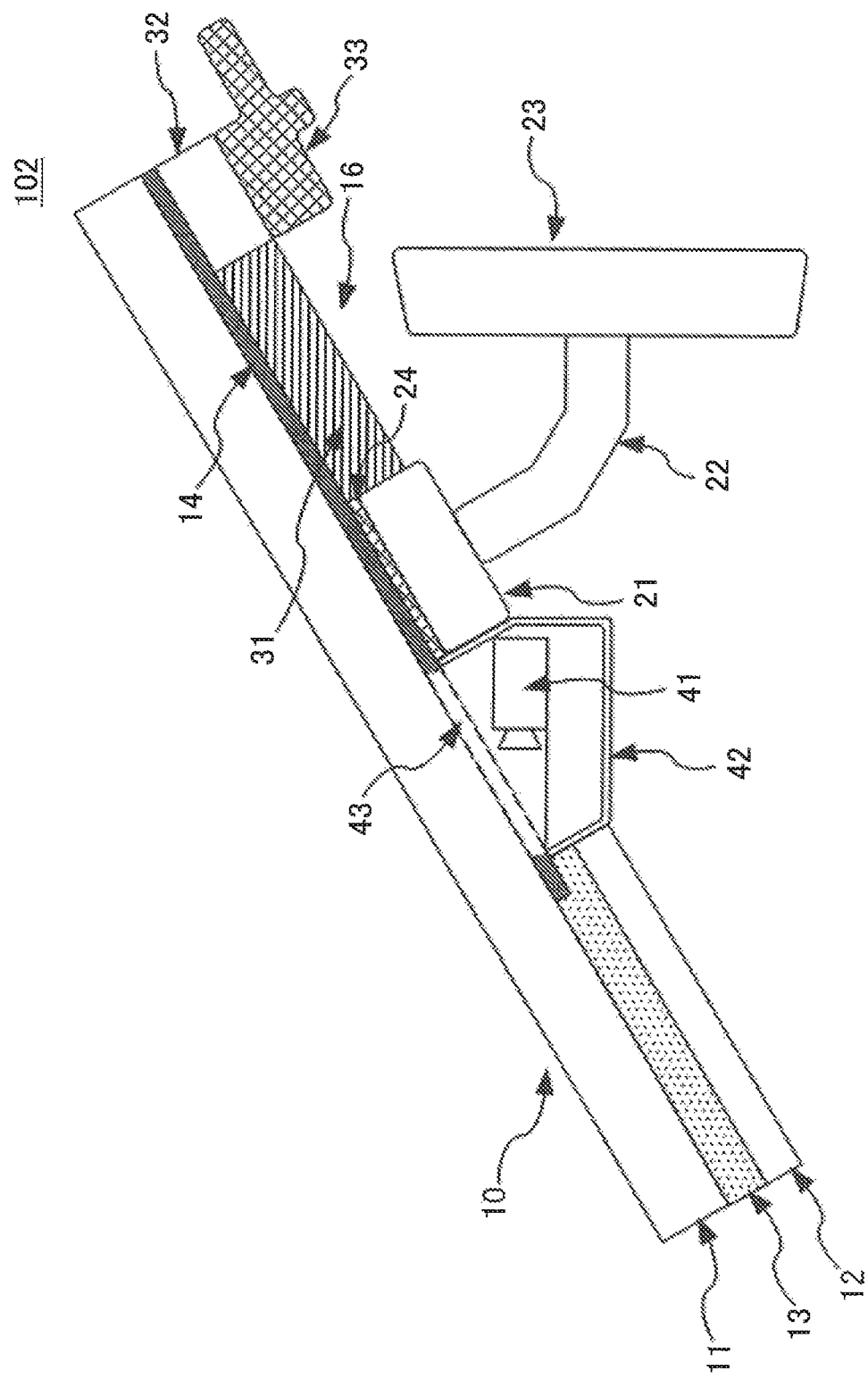
FIG. 5 is a cross-sectional view of a main part of an upper edge portion of a laminated glass for vehicle with an inner mirror according to a third embodiment of the present invention, when the laminated glass is mounted to a vehicle body.

FIG. 5 is a cross-sectional view of a main part of an upper edge portion of a laminated glass for vehicle with an inner mirror according to a third embodiment, when the laminated glass is mounted to a vehicle body. As shown in FIG. 5, in a laminated glass 10 of the laminated glass for vehicle with an inner mirror 102 according to the third embodiment, a cutout portion 16 is also formed inward with respect to the mirror base 21 in the in-plane direction. At a position in the cutout portion 16 inward with respect to the mirror base 21 in the in-plane direction, i.e. on the vehicle interior surface of the vehicle outside glass plate 11 and inward with respect to the mirror base 21 in the in-plane direction, an information device support member 42, to which an information device 41 can be mounted, is arranged. Moreover, the laminated glass for vehicle with an inner mirror 102 according to the third embodiment is different from the laminated glass for vehicle with an inner mirror 100 according to the first embodiment in that an opening 43 is formed in the shielding layer 14 in a region in which the information device 41 faces the laminated glass 10, so that the information device 41 receives information from the vehicle outside and the information device 41 sends information to the vehicle outside. Other components are the same as those in the laminated glass for vehicle with an inner mirror 100 according to the first embodiment. Thus, the same reference numerals are assigned to the corresponding components, and an explanation thereof will be omitted.

The information device 41 informs the driver of danger so as to prevent the vehicle that the driver drives from colliding with a vehicle, a pedestrian, an obstacle or the like observed in front of the driver's vehicle by using a camera, a radar device or the like. The information device 41 is, for example, an information reception device and/or an information transmission device, and includes a millimeter wave radar device, an onboard camera, an infrared laser device, or the like. Moreover, the information device 41 may be a variety of sensors including a rain sensor or the like. The information device support member 42 includes one or more among the information reception device, the information transmission device, and the sensors, as described above.

Recently, for safe traveling of vehicle, for example, a plurality of information devices 41, such as an onboard camera, a rain sensor, and an infrared laser device, have been mounted to the information device support member 42. A plurality of kinds of data detected by the information devices 41 are combined and processed. However, the plurality of information devices 41 mounted to the information device support member 42 increase the weight of the information device support member 42. In the conventional structure of the laminated glass for vehicle in which the information device support member 42 is bonded to the vehicle inside glass plate 12, due to the increased weight of the information device support member 42, a great stress against the weight of the information device support member 42 is applied to the vehicle inside glass plate 12, and the vehicle inside glass plate 12 may break.

However, according to the third embodiment, even if the inner mirror 23 and the information device 41 are mounted to the laminated glass 10, in which a thin glass plate having a plate thickness of 1.3 mm or less is used for the vehicle inside glass plate 12, because the mirror base 21 and the information device support member 42 having an increased weight are not mounted to the vehicle inside glass plate having a low rigidity, but mounted to the vehicle outside glass plate 11 having a high rigidity, an external force or a stress against the weight is not applied to the vehicle inside glass plate having the low rigidity. Thus, both the vehicle outside glass plate 11 and the vehicle inside glass plate 12 are less likely to break. Furthermore, a force to deform the vehicle inside glass plate 12 is not applied to the vehicle inside glass plate 12. Thus, a force to separate the intermediate film 13 is not applied to the intermediate film 13, and there is no possibility of generation of bubbles in the peripheral portion of the laminated glass 10.

Furthermore, conventionally, the information device 41 has acquired information from vehicle outside through the laminated glass 10. In the laminated glass for vehicle with an inner mirror 102 according to the third embodiment, the information device support member 42 is mounted to the vehicle outside glass plate 11, and information acquired through the laminated glass 10 is not affected by a glass distortion occurring in the laminated glass 10 in which two glass plates are bonded to each other. That is, in the laminated glass for vehicle with an inner mirror 102 according to the third embodiment, the information device 41 is affected only by glass distortion in the vehicle outside glass plate 11, and errors in the information acquired by the information device 41 caused by glass distortion are small.

FIG. 5 illustrates a configuration in which the information device support member 42 is arranged inward with respect to the mirror base 21 in the in-plane direction. However, the information device support member 42 may be arranged at a position between the upper edge of the laminated glass 10 and the mirror base 21. Moreover, the information device support member 42 and the mirror base 21 may be formed integrally.

In the laminated glass for vehicle with an inner mirror 102 according to the third embodiment, in the same way as in the first embodiment, the upper edge portion 18 of the vehicle inside glass plate 12 other than the cutout portion 16 may be located at the same position as the upper edge portion of the vehicle outside glass plate 11. Moreover, in the same way as in the second embodiment, the upper edge portion 18 of the vehicle inside glass plate 12 other than the cutout portion 16 may be located inward in the in-plane direction with respect to the upper edge portion of the vehicle outside glass plate 11. When the upper edge portion 18 of the vehicle inside glass plate 12 other than the cutout portion 16 is located inward in the in-plane direction with respect to the upper edge portion of the vehicle outside glass plate 11, in the same way as in the second embodiment, the seal member 33 is attached to the vehicle interior surface of the vehicle outside glass plate 11, and the spacer 32 (See FIG. 2) becomes unnecessary.

As described above, with reference to the embodiments the present invention has been described. The present invention is not limited to the embodiments. Various variations and modifications that a person skilled in the art will comprehend may be made for the configurations and details of the present invention without deviating from the scope of the present invention.

INDUSTRIAL APPLICABILITY

The laminated glass for vehicle with an inner mirror according to the present invention is preferably applied to an opening of a passenger vehicle. However, the laminated glass for vehicle with an inner mirror according to the present invention may be applied to any vehicle, such as an on-track vehicle including a railroad vehicle, and a transport vehicle. Furthermore, the laminated glass for vehicle with an inner mirror according to the present invention is not limited to a vehicle, and may be applied also to an aircraft and a ship.

REFERENCE SIGNS LIST 100, 101, 102 laminated glass for vehicle with an inner mirror
10 laminated glass
11 vehicle outside glass plate
12 vehicle inside glass plate
13 intermediate film
14 shielding layer
16 cutout portion
17 edge portion of cutout portion
18 upper edge portion of vehicle inside glass plate other than cutout portion
21 mirror base
22 support arm part
23 inner mirror
24 adhesion layer
31 seal member
32 spacer
33 seal member
41 information device
42 information device support member
43 opening

What is claimed is:
1. A laminated glass for vehicle with an inner mirror mounted to an opening of a vehicle body comprising:
   a laminated glass including a vehicle outside glass plate, and a vehicle inside glass plate bonded to the vehicle outside glass plate via an intermediate film; and
   an inner mirror mounted to the laminated glass via a mirror base, wherein:
   a plate thickness of the vehicle inside glass plate is less than a plate thickness of the vehicle outside glass plate, and being 1.3 mm or less, the vehicle inside glass plate has a cutout portion in at least a part of an upper edge, and the mirror base is mounted to a vehicle interior surface of the vehicle outside glass plate through the cutout portion of the vehicle inside glass plate.

2. The laminated glass for vehicle with an inner mirror according to claim 1, wherein:

the vehicle outside glass plate has a shielding layer on a peripheral portion of the vehicle interior surface of the vehicle outside glass plate, and the cutout portion is formed within a region in which the shielding layer is formed.

3. The laminated glass for vehicle with an inner mirror according to claim 2, wherein the mirror base is bonded to the vehicle outside glass plate on the shielding layer via an adhesion layer.

4. The laminated glass for vehicle with an inner mirror according to claim 1, wherein an upper edge portion of the vehicle inside glass plate is located inward in an in-plane direction with respect to an upper edge portion of the vehicle outside glass plate.

5. The laminated glass for vehicle with an inner mirror according to claim 1, wherein an information device support member, to which an information device is capable of being mounted, is arranged on the vehicle interior surface of the vehicle outside glass plate through the cutout portion.

6. The laminated glass for vehicle with an inner mirror according to claim 1, wherein the plate thickness of the vehicle outside glass plate is 2.3 mm or less.

7. The laminated glass for vehicle with an inner mirror according to claim 1, wherein the vehicle inside glass plate is chemically tempered.

* * * * *